United States Patent Office 3,278,635
Patented Oct. 11, 1966

3,278,635
PROCESS FOR POLYMERIZING ALDEHYDES WITH A COORDINATION COMPLEX OF (1) A LEWIS ACID AND (2) AN ORGANIC TERTIARY AMINE OR ORGANIC PHOSPHINE
Bruce N. Bastian, Oakland, Calif., assignor to Shell Oil Company, New York, N.Y., a corporation of Delaware
No Drawing. Filed Oct. 30, 1961, Ser. No. 148,742
17 Claims. (Cl. 260—823)

This invention relates to the polymerization of aldehydes. More particularly, the invention relates to a new process for polymerizing aldehydes to form valuable crystalline polyether polymers, to the resulting products and to their utilization.

Specifically, the invention provides a new and efficient process for converting aldehydes, and preferably those free of conjugated double bonds, such as, for example, acetaldehyde and halogenated acetaldehydes, to high molecular weight crystalline polyether polymers, which process comprises contacting the aldehyde with a coordination complex of (1) a Lewis acid, and preferably one containing a metal of groups III to V of the Periodic Table of Elements, and containing halogen, such as, for example, aluminum tribromide, and (2) an organic tertiary amine or organic phosphine, under substantially anhydrous conditions and an inert atmosphere, and preferably at a temperature below about −40° C.

It is known that saturated aldehydes, such as acetaldehyde, can be converted to high molecular weight polymers by contacting with an alkali metal alkoxide. This process, however, is not particularly useful for commercial operations as the yields of the polymer obtained are quite low.

It is, therefore, an object of the invention to provide a new process for polymerizing aldehydes. It is a further object to provide a new process for converting aldehydes to high molecular weight polymers. It is a further object to provide a process for converting aldehydes to polymers having various degrees of crystallinity. It is a further object to provide a method for preparing crystalline high molecular weight polymers of aldehydes in high yield. It is a further object to provide a new process for preparing valuable copolymer of aldehydes. It is a further object to provide a process for preparing polymers of aldehydes which are particularly useful and valuable. These and other objects of the invention will be apparent from the following detailed description thereof.

It has now been discovered that these and other objects may be accomplished by the process of the invention which comprises contacting the haldehyde with a coordination complex of (1) a Lewis acid, and preferably one containing a metal of groups III to V of the Periodic Table of Elements, and containing halogen, such as, for example, aluminum tribromide, and (2) an organic tertiary amine or organic phosphine, under substantially anhydrous conditions and in an inert atmosphere, and preferably at a temperature below about −40° C. It has been surprisingly found that this technique converts the aldehydes into high yields of high molecular weight polyether polymers. It has been further found that the resulting polymers have various degrees of crystallinity. The products can be utilized in many important applications as they can be pressed or molded into various plastic articles, and depending on degree of crystallinity, can be utilized in solvent solution to form coatings, impregnating compositions and the like.

It has further been found that the crystallinity of the resulting polymer can be increased to a still higher level by the novel feature of including a monoepoxide, and preferably an alkylene oxide, in the reaction mixture as described below. This is accomplished without materially affecting the molecular weight or other desired properties of the polymer.

It has been still further surprisingly found that the solubility of the polyether polymers can be improved by the addition to the reaction mixture of small amounts of relatively high molecular weight polymers of alkylene oxides, such as polymers of ethylene oxide. Such a procedure greatly improved the solubility of the polymer in toluene, benzene, acetone and the like.

It has also been found that the stability of the aldehyde polymers can be improved by treatment of the polymers with reactants such as diaza compounds and vinyl compounds substituted with an electron withdrawing group in the vicinity of the vinyl group.

The aldehydes to be polymerized by the process of the invention include those having at least one free

group and are preferably free of conjugated double bonds. Examples of the aldehyde include, among others, formaldehyde, acetaldehyde, butyraldehyde, isobutyraldehyde, propionaldehyde, valeraldehyde, dihydropyran carboxaldehyde, hexanal, 2-ethylhexanal, acrolein, crotonaldehyde, furfural, phenylacetaldehyde, monochloroacetaldehyde, dichloroacetaldehyde, trichloroacetaldehyde, cyclohexanecarboxaldehyde, methoxycyclohexanecarboxyaldehyde, cyclohexenecarboxyaldehyde, butoxyacetaldehyde, tetrahydrobenzaldehyde, glycidaldehyde, glyoxal, and the like, and mixtures thereof. Preferred aldehydes to be employed include the aliphatic and cycloaliphatic monoaldehydes containing up to 18 carbon atoms which are free of conjugated double bonds.

The process of the invention can be used for the homopolymerization of any of the above-described aldehydes as well as the copolymerization of two or more of the said aldehydes, such as, for example, mixtures of acetaldehyde with formaldehyde, chloral, propionaldehyde, butyraldehyde, tetrahydrobenzaldehyde and the like. In making the copolymers, the proportions of the different aldehydes may vary over a wide range, such as, for example, 1% to 99% of one aldehyde to 99% to 1% of the other aldehyde. In making copolymers from acetaldehyde and the other aldehydes, it is generally preferred to prepare products having at least 5% by weight of acetaldehyde, and preferably from 10% to 95% by weight of the acetaldehyde, based on the total weight of polymer.

The above-described aldehydes or mixtures of aldehydes are polymerized according to the process of the invention by contacting the aldehydes with a coordination complex of a Lewis acid and an organic tertiary amine or organic phosphine. By Lewis acid is meant a material which accepts an electron pair to form a coordinate bond. Examples of Lewis acids include, among others, aluminum trichloride, aluminum tribromide, aluminum trifluoride, ethyl aluminum dichloride, diethyl aluminum chloride, butyl aluminum dibromide, amyl aluminum dibromide, diamyl aluminum bromide, diethyl aluminum fluoride, antimony trifluoride, antimony tribromide, antimony trichloride, ethyl antimony dichloride, diethyl antimony chloride, stannic tetrachloride, silver perchlorate, boron trifluoride, sulfur dioxide, and the like. Preferred Lewis acids are those containing a metal of Groups IIII to V of the Mendeleeff's Periodic Table of Elements, and also containing halogen, such as chlorine, bromine and fluorine.

The amines used in the preparation of the coordination complexes may be any tertiary amine which may be aliphatic, cyclo-aliphatic, aromatic or heterocyclic and may be saturated or unsaturated. Examples of these include, among others, triethylamine, tributyl amine, tricyclohexyl amine, triphenyl amine, triisobutyl amine, pyridine, diethylpyridine, trioctylamine, diamyl cyclohexylamine, and the like, and mixtures thereof. Preferred amines are the trialkyl amines, tricycloalkyl amines and triaryl amines containing up to 10 carbon atoms in each radical.

The organic phosphines that may be used in preparing the coordination complexes are those of the formula $P(R)_3$ wherein at least one R is an organic radical. Preferred phosphines include the trihydrocarbyl phosphines, such as, for example, triphenyl phosphine, tricyclohexyl phosphine, diphenyl cyclohexyl phosphine, tributyl phosphine, trihexyl phosphine, tricyclohexenyl phosphine, trixylyl phosphine, tridodecyl phosphine, dodecyl diphenyl phosphine and the like. Preferred phosphines are the trialkyl, tricycloalkyl, tri(alkylcycloalkyl), triaryl and tri(alkaryl) phosphines, and especially those wherein the alkyl, cycloalkyl, alkylcycloalkyl, aryl and alkaryl radicals contain up to 12 carbon atoms. Coming under special consideration are the aromatic hydrocarbyl phosphines.

The effectiveness of the complex increases with the base strength of the amines and phosphines so the stronger bases are preferred.

The coordination complexes may be prepared by various methods. It is generally preferred to prepare the complexes in situ by merely adding the amine or phosphine to a solvent solution of the Lewis acid. The solvents employed are generally those utilized in the preparation of the polymer as described hereinafter. The amount of the components employed is important to obtaining the desired superior results. The amount of the tertiary amine or organic phosphine employed should be sufficient to furnish at least one mole per halogen present in the Lewis acid. Amounts greater than two moles per halogen may be employed but do not appear to give any improved results. The temperatures employed in making the complex may vary over a wide range. In general, the reaction takes place by merely mixing the components at room temperature and it is not necessary to apply external heat. In some cases, the reaction may be speeded by heating say to temperatures of 25° C. to 50° C. The complexes prepared in this manner are reactive with water and air and should be kept under substantially anhydrous conditions and in an inert atmosphere until utilized in the process of the invention.

The amount of the above-described catalyst to be employed in the process of the invention may vary over a considerable range. Preferred amounts vary from about .1 mole to 5 mol per 100 mol of aldehyde to be polymerized. Particularly good results are obtained when one utilizes about .8 to 1.2 mol of the catalyst per 125 mol of the aldehyde.

The polymerization may be conducted in bulk or in the presence of suitable solvents or diluents. Preferred solvents include the hydrocarbon liquid materials, such as toluene, benzene, cyclohexane, and the like, and mixtures thereof. Sufficient solvent is employed so as to form a workable reaction mixture.

The reaction is conducted under substantially anhydrous conditions. This means that the reactants, reaction vessel, etc. must be substantially free of moisture. This may be accomplished by use of conventional techniques, such as heating, driers and the like.

The reaction is also preferably conducted in an inert atmosphere. This may be accomplished in high vacuum or by the use of inert gas such as, for example, in an atmosphere of nitrogen, methane, ethane and the like.

The reaction is conducted at a relatively low temperature and preferably below $-40°$ C. Preferred temperatures range from about $-40°$ C. to $-150°$ C. In the case of acetaldehyde which has a tendency to polymerize by itself at its melting point ($-123.5°$ C.), it is preferred to operate at temperatures above $-120°$ C. The low temperatures can be maintained by any conventional technique, such as Dry Ice baths, etc.

The pressure employed in the process may be atmospheric, super-atmospheric or subatmospheric depending on that which is desired or necessary for the operation of the process.

The length of the reaction period may vary over a wide range depending on temperature, type of catalyst, etc. In most cases, the polymerization will be accomplished within about 1 to 30 hours, and preferably around 1 to 15 hours.

The polymer may be recovered from the reaction mixture or mass by any suitable means, such as precipitation, extraction, filtration and the like. It is generally preferred to take up the reaction mixture in an alcohol so as to kill the catalyst and help remove the catalyst from the polymer particles, and then filter the mixture to recover the solid polymer.

As noted above, it has been found that the process can be varied so as to give products having higher degree of crystallinity or to give products which have improved solubility in conventional solvents. The improvement in crystallinity is obtained by adding a monoepoxide material, and preferably an alkylene oxide, to the reaction mixture, preferably during the early phases of the reaction. Suitable monoepoxides that may be added include ethylene oxide, propylene oxide, styrene oxide, butylene oxide, epichlorohydrin, glycidyl esters, glycidyl ethers and the like. Preferred monoepoxides are the alkylene oxides containing from 2 to 4 carbon atoms. These materials are preferably added in amounts varying from about 1% to 200% by weight of the aldehyde being polymerized.

The solubility of the polymers in conventional solvents, such as benzene and toluene, can be improved by the addition to the reaction mixture of a polymer of a monoepoxide, and preferably a polymer of an alkylene oxide. Examples of these additives include the polymers of any of the above-described monoepoxides, but preferably polymers of alkylene oxides having molecular weights above 50,000 and preferably above 800,000, such as between 1 and 2 million as determined by the light scattering technique. These polymers are added in small amounts, and preferably in amounts varying from about 0.05% to 10% by weight of the aldehyde, and still more preferably from 0.1% to 5% by weight of the aldehyde.

The polymers obtained by the above-described process are high molecular weight polyether polymers. These polymers contain a main chain such as

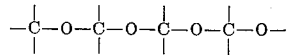

wherein the carbon is attached to appropriate groups, such as hydrogen or organic radicals, depending on the aldehyde used in the polymerization. The polymers have molecular weight above about 50,000 and preferably 75,000 to 2,000,000 as determined by viscosity measurements. The molecular weights of the products may also be indicated in terms of intrinsic viscosity measurements as these are more easily determined. Preferred polymers are those having intrinsic viscosities (as determined in chloroform at 30° C.) of 0.5 dl./g. to 6.0 dl./g.

The new polymers will also have various degrees of crystallinity as determined by X-ray analysis. Crystallinity may vary up to 80% or higher. As noted above, crystallinity can be improved by the introduction of the monoepoxides into the reaction mixture.

The highly crystallinity products will have limited solubility in solvents. Products having lower crystallinity but better solubility can be obtained by including monoepoxides in the formation of the polymer. When prepared in this manner, the polymers may have improved solubility in toluene, acetone, chloroform and the like.

The new polymers also have improved heat stability over polymers of aldehydes prepared by other polymerization techniques.

The stability of the polymers can be further improved by a novel feature of further reacting the polymers with certain reactive components, such as with anhydrides, orthoesters, isocyanates, and particularly with diazo compounds, such as diazomethane, and with vinyl compounds having an electron withdrawing group near the vinyl group, such as, for example, divinyl sulfone, acrylonitrile and the like. Amounts of these materials vary from about .1 part to 100 parts per 100 parts of polymer. This reactant can be conducted in the presence or absence of solvents or diluents. If the reactant is a liquid, one may use that as the reaction medium, or additional inert materials, such as toluene, benzene, dichloromethane and the like may be utilized. Temperatures employed in the reaction may vary over a wide range. Preferred temperatures range say from −40° C. to 40° C.

With the compounds as divinyl sulfone and low molecular weight alkylene oxides, improved stability is obtained by adding these materials directly to the reaction mixture before or during polymerization. Same conditions and properties as noted above apply.

The polymers of the present invention may be utilized for a variety of different applications. They can be press molded into attractive plastic articles or formed into sheets, fibers and the like. They may be used by themselves in these applications or they can be combined with various plasticizing materials, such as esters, as dioctyl phthalate, tricresyl phosphate, 1,5-pentanediol dipropionate, hexanetriol triacetate, polyethylene glycols, polypropylene glycols, glycerol, hexanetriol, glycerol tributyl ether and the like, and mixtures thereof.

The new polymers may also be blended or otherwise combined with other polymers and resins or tars and pitches. They may be combined, for example, with epoxy resins, polyurethane resins, polyamides, urea-formaldehyde and phenol resins, polythiopolymercaptans, vinyl resins, coal tar, asphalt, middle oil, coal tar pitch, and the like, in various proportions. Blending is to improve stability, workability or extend commercial applications.

The new polymers of the invention having the necessary solubility in solvents may be utilized in the formation of surface coating compositions and impregnating compositions or for the treatment of cloth, paper and the like.

To illustrate the manner in which the invention may be carried out, the following examples are given. It is to be understood, however, that the examples are for the purpose of illustration and the invention is not to be regarded as limited to any of the specific conditions or reactants cited therein. Unless otherwise indicated, parts are parts by weight as to catalysts and solids and parts by volume as to liquids.

*Example I*

This example illustrates the polymerization of acetaldehyde using a coordination complex of diethyl aluminum chloride and triethyl amine (1:1 mole ratio).

To a dry reaction flask equipped with a nitrogen inlet and outlet were added 50 parts of dry toluene. 0.10 part of triethylamine and 0.12 part of diethyl aluminum chloride were added to the reaction vessel and the vessel cooled in a bath of isopropyl alcohol and solid carbon dioxide. 15 parts of distilled acetaldehyde were then introduced into the cold reactor via syringe. The reaction vessel and its contents were maintained at about −75° C. for 20 hours. At the end of this time, the resulting hard polymer cake was reduced to a thick slurry in methanol. The slurry was poured into water and the white granular polymer was collected on a filter. After vacuum drying at 40–50° C. the recovered dry product weighed 8 parts.

The above polymer had a crystallinity of about 70% as determined by X-ray diffraction pattern. Infrared spectroscopic analysis confirmed the presence of the alternating carbon-oxygen linkages in the main polymer chain. The polymer had only limited solubility in benzene and displayed improved heat stability. The polymer could be pressed into attractive plastic sheets.

*Example II*

This example demonstrates the superior results obtained by the process of the invention over the results obtained by the use of other catalysts.

(A) Acetaldehyde was polymerized with a coordination catalyst of diethyl aluminum chloride and triethylamine by the procedure shown in Example I. The polymer was obtained in 67% yield and had excellent shelf life.

(B) The procedure shown in Example I was repeated with the exception that the catalyst employed was diethyl aluminum chloride itself. In this case, the yield of polymer was only 22% and the product decomposed within 24 hours at room temperature.

*Example III*

This example illustrates the polymerization of acetaldehyde using a coordination complex of aluminum bromide and triethylamine (1:3 mole ratio).

To a dry reaction vessel as described in Example I were added 50 parts of dry toluene and then 0.30 part of triethylamine and .27 part of anhydrous aluminum bromide. The reaction vessel was then cooled as in Example I. 15 parts of distilled acetaldehyde were then introduced into the cold reaction vessel via a syring. The vessel was maintained at −75° C. for 20 hours. At the end of this time, the polymer was recovered by treatment with methanol and filtering. The resulting product was a crystalline polymer (8.1 parts) which was identified as a polyether having alternating carbon and oxygen atoms in the main chain. The polymer had limited solubility in benzene and displayed improved heat stability. The polymer could be pressed into attractive plastic sheets.

*Example IV*

Example I was repeated with the exception that the catalyst employed was one obtained by reacting 1 mol aluminum bromide with 3.7 mol of tributyl phosphine. Related results are obtained.

*Example V*

Example I was repeated with the exception that the catalyst employed was a coordination complex of 1 mol of diethyl aluminum chloride and 1.0 mol of triphenylphosphine. Related results were obtained.

*Example VI*

Example I was repeated with the exception that the catalyst employed was a coordination complex of 1 mol of aluminum bromide and 3 mol of triphenyl phosphine. Related results were obtained.

*Example VII*

Example I was repeated with the exception that the catalyst employed was a coordination complex of 1 mol of ethyl aluminum dichloride and 2 mol of triethylamine. Related results were obtained.

*Example VIII*

This example illustrates the polymerization of isobutyraldehyde using a coordination complex of diethyl aluminum chloride and triethyl amine (1:1 mol ratio).

To a dry reaction vessel as described in Example I were added 50 parts of dry toluene. 1 millimole of diethyl aluminum chloride and 1 millimole of triethylamine were added to the reaction vessel and the vessel cooled as in Example I. 20 parts of distilled isobutyraldehyde were then introduced into the cold reaction vessel. The vessel was maintained at −75° C. for 20 hours. At the end of this time, the polymer was recovered by treatment with methanol and filtering. The resulting product was a crystalline polymer (5.6 parts) which was identified as a polyether having alternating carbon and oxygen atoms in the main chain. The polymer could be pressed into attractive plastic sheets.

*Example IX*

This example illustrates the polymerization of propionaldehyde using a coordination complex of diethyl aluminum chloride and triethyl amine (1:1 mol ratio).

To a dry reaction vessel as described in Example I were added 50 parts of dry toluene. To this vessel was added 1 millimole of diethyl aluminum chloride and triethylamine. The vessel was cooled as in Example I and to the cooled vessel were added 15 parts of distilled propionaldehyde. The vessel was maintained at $-75°$ C. for 20 hours. At the end of this time, the polymer was recovered by treatment with methanol and filtering. The resulting product was a high molecular weight crystalline polyether polymer which could be pressed into attractive plastic sheets.

*Example X*

Example IX was repeated with the exception that the catalyst employed was a coordination complex of aluminum bromide and triethyl amine (1:3 mol ratio). Related results were obtained.

*Example XI*

This example illustrates the use of the process of the invention in polymerizing 5-dihydropyrancarboxaldehyde using a coordination complex of diethyl aluminum chloride and triethylamine (1:1 mol ratio).

To a dry reaction vessel as described in Example I were added 50 parts of dry toluene. To this vessel was added 1 millimole of diethyl aluminum chloride and triethylamine. The vessel was cooled as in Example I and to the cooled vessel were added 20 parts of distilled dihydropyrancarboxaldehyde. The vessel was maintained at $-75°$ C. for 20 hours. At the end of this time, the polymer was recovered by treatment with methanol and filtering. The resulting product was a high molecular weight crystalline polymer having repeating carbon-oxygen atoms in the main chain. The polymer could be pressed into attractive plastic sheets.

*Example XII*

Example XI was repeated with the exception that the catalyst employed was a coordination complex of aluminum tribromide and triethyl amine (1:3 mol ratio). Related results were obtained.

*Example XIII*

Example I was repeated with the exception that 12 parts of ethylene oxide was introduced into the reaction zone. The resulting polymer had improved degree of crystallinity.

*Example XIV*

Example I was repeated with the exception that 0.5 part of polyethylene oxide having a molecular weight of about 2,000,000 was introduced into the reaction mixture. The product in this case had improved solubility in solvents such as toluene.

*Example XV*

Example I was repeated with the exception that the temperature employed was $-50°$ C. Related results were obtained.

*Example XVI*

Example III was repeated with the exception that the ratio of catalyst to monomer was changed to 1.2:15. Related results were obtained.

*Example XVII*

Example I was repeated with the exception that the acetaldehyde was replaced with a 50–50 mixture of acetaldehyde and propionaldehyde. The resulting product was a high molecular weight crystalline copolymer of 58% acetaldehyde and 42% propionaldehyde which could be pressed into attractive plastic films.

*Example XVIII*

Example I is repeated with the exception that the acetaldehyde is replaced with a 50–50 mixture of acetaldehyde and dihydropyrancarboxaldehyde. The resulting product is a high molecular weight crystalline copolymer.

*Example XIX*

The polymer shown in Example I was reacted with each of the following components: acetic anhydride and diazomethane and phenyl isocyanate. Products having improved heat stability were obtained.

*Example XX*

Using the polymerization technique described in Example I, acetaldehyde (15 parts) was polymerized in toluene (50 parts) and ethylene oxide (12 parts) with aluminum bromide (1.0 mmole) and tributyl phosphine (3.7 mmole). Polyacetaldehyde (2.36 parts) was obtained from this reaction as a white powder which was pressed into clear films at room temperature under 14,000 pounds pressure. The X-ray diffraction pattern of this polymer demonstrated its high crystallinity.

*Example XXI*

A dry 3-necked polymerization flask was equipped with a stirrer, a rubber diaphragm, and a nitrogen inlet and outlet. Under an anhydrous oxygen free nitrogen atmosphere the flask was charged with dry high molecular weight (ca $10^6$) polyethylene oxide (0.7 part) and dry toluene (150 part). Catalyst prepared by mixing diethyl aluminum chloride (3 mmole) and triethyl amine (3 mmole) in toluene (3.0 parts) and heptane (1.5 part) was transferred to the stirred reactor which was maintained at $-70°$ in an isopropyl alcohol-solid carbon dioxide bath. Acetaldehyde (45 parts) was introduced into the cold ($-70°$) stirred reactor via syringe. Within five minutes the viscosity increased indicating the formation of polymer. After 16 hours at $-70°$, toluene (100 parts), chloroform (100 parts) and ethylene glycol (5 parts) were added to dissolve the hard polymer cake. After washing the polymer solution with water (4–300 part portions), solvent was removed under reduced pressure. The rubbery polymer was vacuum dried for 24 hours and weighed 27.9 parts. The polymer thus obtained is less crystalline than the modification without polyethylene oxide and is of use for applications demanding soluble polymers such as surface coatings.

*Example XXII*

Polyacetaldehyde (250 parts) and diazomethane (13 parts) in dichloromethane (7500 parts) and ether (1500 parts) were held at $-17°$ to $25°$ C. for 16 hours. Unreacted diazomethane and solvents were removed under reduced pressure. After vacuum drying 245 parts of polymer were recovered. The treatment increased stability by a factor of 3.6 times.

Using 300 parts of polyacetaldehyde to 82 parts diazomethane, a 7 fold increase in stability was achieved.

*Example XXIII*

Related results are obtained by replacing the diazomethane in the preceding example with divinylsulfone and sodium hydride.

I claim as my invention:

1. A process for polymerizing aldehydes to form high molecular weight crystalline polymers which consists of contacting the aldehyde of the group consisting of acetaldehyde, halogenated acetaldehydes, propionaldehyde, tetrahydro-benzaldehyde and mixtures of the foregoing with a coordination complex of a Lewis acid containing halogen and a basic member of the group consisting of tertiary amines and organic aromatic phosphines, under substantially anhydrous conditions and in an inert atmosphere at a temperature below about −40° C., said coordination complex being prepared under such conditions that there is at least one mole of the basic member per halogen atom in the Lewis acid.

2. A process for polymerizing aldehydes to form high molecular weight crystalline polymers which consists of contacting the aldehyde of the group consisting of acetaldehyde, halogenated acetaldehydes, propionaldehyde, tetrahydro-benzaldehyde, and mixtures of the foregoing with a coordination complex of (1) a Lewis acid containing a metal of groups II to IV of the Mendeleeff's Periodic Table, and a halogen atom, and (2) a basic member of the group consisting of tertiary amines and organic aromatic phosphines, under substantially anhydrous conditions and in an inert atmosphere, and at a temperature below about −40° C., said coordination complex being prepared under such conditions that there is at least one mole of the basic member per halogen atom in the Lewis acid.

3. A process as in claim 2 wherein the aldehyde is acetaldehyde.

4. A process as in claim 2 wherein the aldehyde is tetrahydrobenzaldehyde.

5. A process as in claim 2 wherein the aldehyde is propionaldehyde.

6. A process as in claim 2 wherein the coordination complex is an aluminum halide-trialkylamine complex.

7. A process as in claim 2 wherein the coordination complex is an aluminum trihalide-triaryl phosphine complex.

8. A proces as in claim 2 wherein the coordination complex is dialkyl aluminum halide-trialkylamine complex.

9. A process as in claim 2 wherein the coordination complex is an aluminum tribromide-triethyl amine complex.

10. A process as in claim 2 wherein the temperature employed varies from −40° C. to −150° C.

11. A process as in claim 2 wherein the coordination complex is employed in an amount varying from .1 to 5 mols per 100 mols of aldehyde.

12. A process for preparing high molecular weight polymer of acetaldehyde which consists of contacting the acetaldehyde in a hydrocarbon solvent solution with a coordination complex of an aluminum trihalide-tertiary amine complex in an amount of .1 to 5 mols per 100 mols of aldehyde under substantially anhydrous conditions and an inert atmosphere at a temperature between −40° C. and −120° C., said coordination complex being prepared under such conditions that there is at least one mole of the basic member per halogen atom in the Lewis acid.

13. A process for preparing a high molecular weight copolymer of acetaldehyde and a dissimilar aldehyde which consists of contacting the mixture of aldehydes in a hydrocarbon solvent with a coordination complex of a halide of a member of the group consisting of metals of Groups III to V of the Mendeleeff's Periodic Table of Elements and an organic tertiary amine containing up to 18 carbon atoms, in an amount of .1 to 5 mols per 100 mols of aldehyde, under substantially anhydrous conditions and an inert atmosphere at a temperature between −40° C. and −150° C., said coordination complex being prepared so that there is at least one mole of the tertiary amine per halogen atom in the Lewis acid.

14. A process as in claim 2 wherein an alkylene oxide is added to the reaction mixture.

15. A process as in claim 2 wherein a polymer of an alkylene oxide is added to the reaction mixture.

16. A process as in claim 13 wherein the catalyst is a complex of diethyl aluminum chloride and triethylamine.

17. A process as in claim 2 wherein the catalyst is a complex of diethyl aluminum chloride and triphenylphosphine.

References Cited by the Examiner

UNITED STATES PATENTS

| | | | |
|---|---|---|---|
| 2,274,749 | 3/1942 | Smyers | 260—67 |
| 2,505,366 | 4/1950 | Schoene | 260—79.3 |
| 2,543,237 | 2/1951 | Evans et al. | 260—67 |
| 2,679,498 | 5/1954 | Seven et al. | 260—67 |
| 2,989,511 | 6/1961 | Schnizer | 260—67 |
| 3,002,952 | 10/1961 | O'Connor | 260—67 |
| 3,031,435 | 4/1962 | Tesoro | 260—79.3 |
| 3,122,524 | 2/1964 | Koral et al. | 260—67 |
| 3,132,141 | 5/1964 | Rebaudo | 260—67 |

FOREIGN PATENTS 876,956  9/1961  Great Britain.

OTHER REFERENCES

Vogl: Chemistry and Industry, June 3, 1961, pp. 748–749, TP1S63.

WILLIAM H. SHORT, *Primary Examiner.*

HAROLD BURSTEIN, *Examiner.*

L. M. MILLER, H. D. ANDERSON,
*Assistant Examiners.*